(No Model.) 2 Sheets—Sheet 1.
J. F. NICHOLS.
ADVERTISING VEHICLE.
No. 373,845. Patented Nov. 29, 1887.
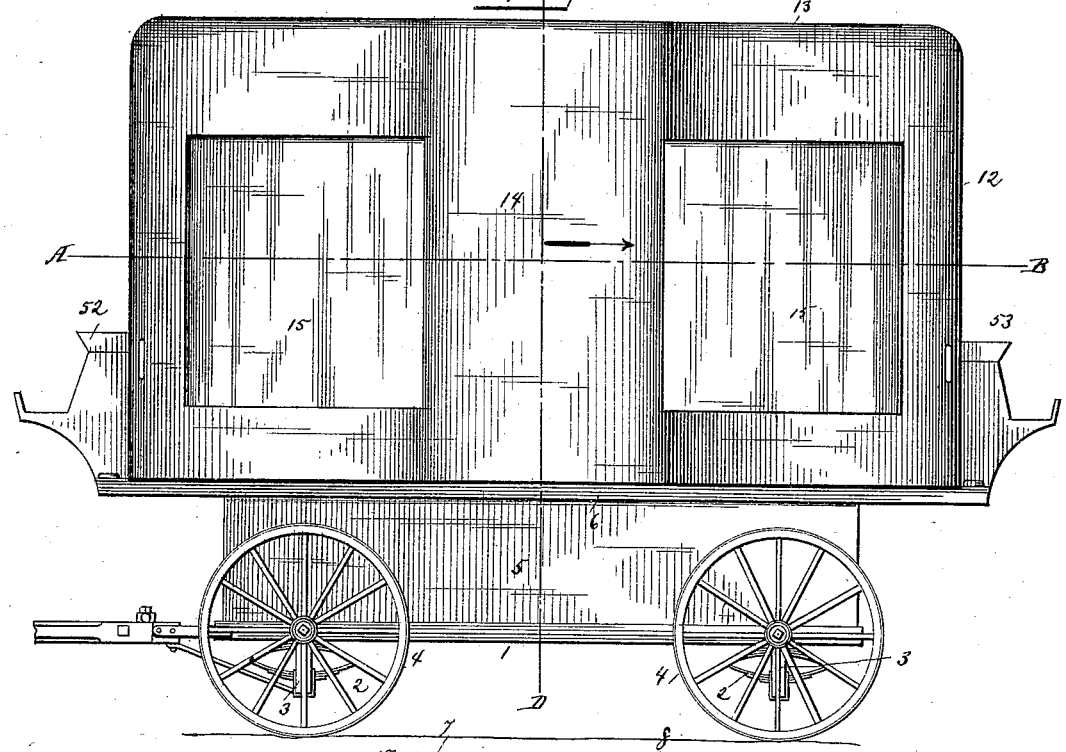
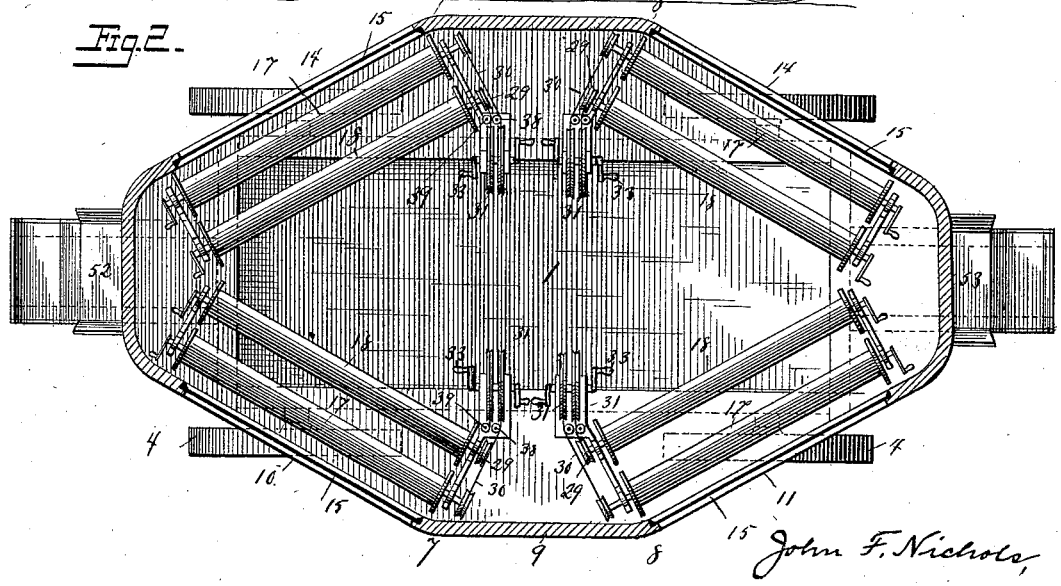
Attest:
Jno. G. Hinkel Jr.
J. J. McCarthy.
John F. Nichols,
Inventor:
By Foster & Freeman,
attys.

(No Model.) 2 Sheets—Sheet 2.
J. F. NICHOLS.
ADVERTISING VEHICLE.
No. 373,845. Patented Nov. 29, 1887.
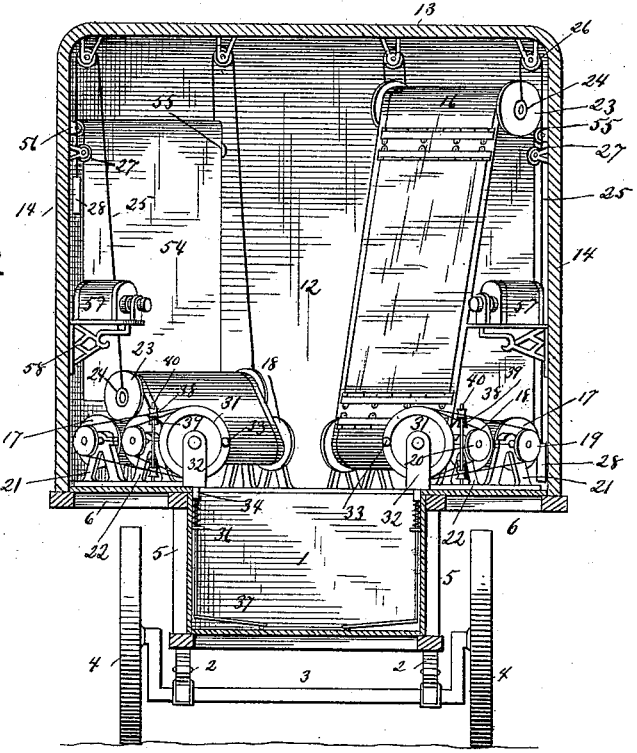
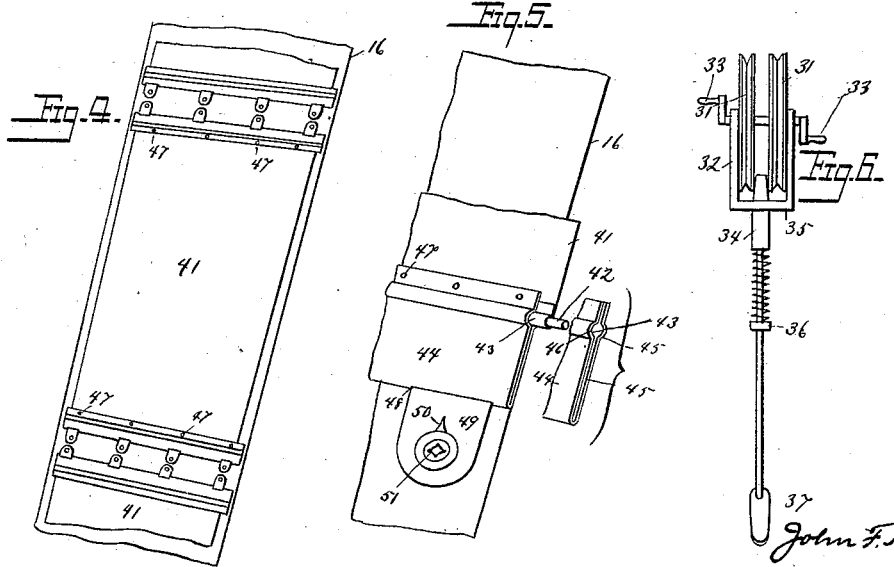
Attest:
Jno. G. Hinkel Jr
J. J. McCarthy.
Inventor:
John F. Nichols,
By Fisher & Freeman,
attys

UNITED STATES PATENT OFFICE.

JOHN F. NICHOLS, OF CHICAGO, ILLINOIS, ASSIGNOR OF ONE-THIRD TO THOMAS B. BRYAN, OF SAME PLACE.

ADVERTISING-VEHICLE.

SPECIFICATION forming part of Letters Patent No. 373,845, dated November 29, 1887.

Application filed August 30, 1886. Serial No. 212,212. (No model.)

*To all whom it may concern:*

Be it known that I, JOHN F. NICHOLS, residing in the city of Chicago, in the county of Cook and State of Illinois, have made certain new and useful Improvements in Advertising-Vehicles, of which the following is a specification.

My invention relates to improvements in advertising mediums, and has for its object to provide a device of the class named, adapted to be moved from place to place for the purpose of displaying advertisements; and to this end it consists in a vehicle having transparent sides to expose to view advertisements which are placed within said transparent sides, and in the construction, arrangement, and combination of the several parts whereby said end is attained, substantially as hereinafter set forth, and illustrated in the accompanying drawings, wherein similar figures of reference denote similar parts.

In the drawings, Figure 1 represents a side elevation of an advertising device constructed in accordance with my invention. Fig. 2 represents a plan view of the interior thereof, the top of the structure being removed, on the line A B of Fig. 1. Fig. 3 is a transverse sectional view taken on the line C D of Fig. 1, looking in direction of the arrow *m*. Fig. 4 represents in detail a portion of the advertisement-receiving belt, and shows the means employed to secure advertisements thereto. Fig. 5 represents in an enlarged detail view the means to secure the advertisement to the belt. Fig. 6 is a detached detail view of the mechanism for operating the advertisement-receiving belt and the means whereby said belt is held in stationary position when desired.

In the present embodiment of my invention I have shown a vehicle-body, 1, mounted upon springs 2, which are secured by clips in the ordinary manner to axles 3, that are provided with wheels 4, wherewith to move the device from place to place.

I provide the body 1 with parallel sides 5, to the upper edges of which are secured outwardly-projecting flanges or ledges 6, the outer edge of each of which, between the points 7 and 8, is parallel with the sides 5, as shown at 9, and from said points 7 and 8 are beveled or inclined toward the front and rear ends, respectively, of the body 1, as shown at 10 and 11, for a purpose to be explained.

I provide the body 1 with a case or cover, 12, having a top, 13, which conforms in outline to the outline of the ledges or flanges 6, and is connected to said ledges by sides 14, in which are fixed sheets or panes of glass, 15, through which are visible advertisements or other characters upon a traveling belt, 16, situate within the case or cover 12.

The belt 16 is formed of any desired material—as canvas, leather, &c.—and is secured at its opposite ends to rollers 17 and 18, which are mounted upon shafts 19 20, journaled in supports 21 and 22, secured to the ledges or flanges 6 at the opposite sides of the body.

From the rollers 17 and 18 the belts pass over rollers 23, having bearings which are journaled in boxes 24, to which are secured cords or chains 25, that pass over pulleys 26, which are secured to the top 13, thence over guide-pulleys 27, secured to the sides 14, and are provided at their free ends with weights 28. By this arrangement of parts the rollers 23 may be maintained in elevated position, as shown at the right in Fig. 3, or may be lowered and rest upon the upper surface of the rollers 17 and 18, as shown at the left in said figure.

I operate the rollers 17 and 18 to impart motion to the belts 16, through the medium of belts 29 and 30, which connect pulleys, preferably grooved, secured to one end of the rollers 17 and 18, respectively, with grooved wheels 31, which are journaled to supports 32, extending upwardly from the ledges 6, and I provide the shaft of the wheels 31 with a crank, 33, whereby to impart rotation thereto. Spring-pressed pawls 34, which operate in guides 35 and 36, fixed to the sides 14, and are moved by pedals 37, hinged to the floor of the body 1, operate to hold the wheels 31 from rotation, and so hold the belts 16 in fixed or stationary position.

If desired, the belts 29 and 30 may be engaged by guide-pulleys 38 and 39, which are mounted upon supports 40, that project upwardly from the ledges 6; or said belts may be maintained in proper position by any other desired means.

By reference to Fig. 3, it will be seen that the belt 16 will, when the rollers 23 are at the highest point in their limit of movement, extend from bottom to top and side to side of the sheets or panes of glass 15, near the inner surfaces thereof, as shown at the right of said figure; also, that said belts may be withdrawn from before said glass by the lowering of said rollers 23, as shown at the left of said Fig. 3. It is thus apparent that advertisements which are affixed in any manner to the belts 16 may be displayed to or withdrawn from view through the sheets or panes of glass 15, at the will of the operator; also, that the different desired advertisements upon said belts may be successively or otherwise displayed to view by the constant or intermittent forward movement of the belts.

While advertisements may be painted, printed, or otherwise affixed directly upon and to the belts 16, as will be readily understood, I yet prefer to affix such advertisements to sheets or sections of material which are separate from said belts and to removably secure the said sheets or sections to such belts. To this end I secure the opposite ends of sheets or sections 41, upon which the desired advertisement has been affixed, to light rods 42, which are slipped into sockets 43, formed in clamps 44 by grooving the opposite ends of a plate, 45, of metal, as shown at 46, and thereafter bending said plate at its middle to cause said grooves to coincide with each other, as shown in Fig. 5. Rivets 47, which pass through the ends of the plate 45 and through the section 41, between said ends, serve to hold said sections in position. I provide the rear edge of the clamps 44 with cut away portions 48, to permit the insertion therethrough and between the sides of said clamp of elastic ears 49, which are provided with apertures 50, whereby said ears are secured to buttons 51, that are affixed to the belt 16.

It will be understood that the sections 41 may be of any desired length, it only being necessary to place buttons 51 at different points of the belt 16 to accommodate said sections.

From the foregoing description, taken in connection with Fig. 2 of the drawings, it will be apparent that each of the belts 16 may have advertisements thereon which differ from each and every of the advertisements upon the remaining belts, and also that any desired one of said belts may be operated either continuously or intermittently without regard to the remaining belts.

While I prefer to construct the body 1 of the vehicle especially for the purpose herein set forth, it will yet be apparent that a vehicle-body not originally intended for this purpose may be used therefor, it only being necessary to provide such body with the ledges or flanges 6, cover 12, and the attachments to support and operate the belts 16, as herein described.

I provide a seat, 52, at the forward end of the vehicle for the use of the driver, and also a similar seat, 53, at the rear end thereof, for the use of an attendant.

The operation of my device is as follows: The desired advertisements being placed upon the belts 16, and said belts in position upon their respective rollers 17, 18, and 23, as described, are held in close proximity to the panes 11 and 12 through the medium of the cords 25 and weight 28, as hereinbefore described. When it is desired to change the position of said advertisements, or to expose fresh advertisements to view, the rollers 17 and 18 are rotated through the cords 29 and 30 and hand-wheels 31.

The device, as hereinbefore described, may be used after nightfall by placing a suitable light within the body of the vehicle in rear of the belts 16, which will, as is plainly apparent, render the advertisements upon the belts 16 visible. When so used, (after nightfall,) I prefer to lower the belts 16, as hereinbefore described, and use in lieu thereof semi-transparent screens 54 of suitable material, which are normally wound upon rollers 55, that are journaled in bearings 56, secured to the sides 14 above the glasses 15.

Upon the screens 54, I project the desired advertisements through the medium of stereopticons 57, which are placed upon brackets or supports 58, that are secured to the sides 14, as shown.

If desired, the opposite ends of the cover 12 may be either open or provided with apertures closed by doors or screens, as shown by dotted lines.

Modifications in detail of construction may be made in the within-described invention without departing from the spirit or sacrificing the advantages thereof. I therefore claim the right to make any and all modifications therein as shall properly fall within the scope and limit of said invention, as herein set forth.

I claim—

1. A vehicle having transparent or semi-transparent sides arranged at angles to the longitudinal axis of the body thereof, an independent belt arranged behind each of said sides to receive advertisements, and means, substantially as described, to move said belts independently of each other at the will of the operator, substantially as described.

2. A body supported upon wheels and provided with a cover or casing having transparent or semi-transparent sides, an independent belt arranged within and in juxtaposition to each of said sides to receive and display advertisements therethrough, horizontal rollers to move each of said belts independently of the others, and connected means, substantially as described, to rotate said rollers, in combination with spring-pressed pawls to hold the rollers of each belt against rotation, as and for the purpose described.

3. A body supported upon wheels and provided with a cover or casing having transparent or semi-transparent sides, belts arranged in juxtaposition to said sides to receive advertisements, rollers to move said belts, and means, substantially as described, to operate said rollers, in combination with removable sections on which the advertisements are secured and means, substantially as described, to hold said sections in position upon said belt, as and for the purpose set forth.

4. A vehicle having transparent or semi-transparent sides, movable belts arranged in juxtaposition to said sides, rollers to move said belts, and means to hold said rollers in stationary position, in combination with advertisement-receiving sheets or sections separate from said belts and securing-clamps to hold said sheets or sections upon said belts, as and for the purpose specified.

5. A vehicle-body with a casing or cover having transparent or semi-transparent sides, movable belts arranged within and in juxtaposition to said sides, two horizontal rollers journaled in fixed supports, an intermediate horizontal roller journaled in movable supports above the fixed rollers to move said belt, and means, substantially as described, to rotate and to move the upper roller toward or from the lower rollers, as and for the purpose described.

6. In an advertising medium, a body mounted upon wheels and provided with sides having projecting flanges or ledges, a casing or cover provided with transparent sides, belts arranged in juxtaposition to said sides, rollers journaled in fixed bearings, and rollers journaled in movable bearings, in combination with a cord and weight to hold said movable bearings at different desired points, substantially as described.

7. An advertising-vehicle provided with a body having transparent or semi-transparent sides, a traveling belt carrying advertisements and arranged within said body adjacent to one of said sides, means, substantially as described, for adjusting said belt to expose it to view, an independent adjustable screen, also located in rear of and adjacent to said transparent or semi-transparent side, and a stereopticon, as and for the purpose set forth.

8. An advertising-vehicle provided with transparent or semi-transparent sides, an independent advertisement-carrying belt in rear of and adjacent to each of said sides, rollers 17 18, mounted in fixed bearings, upon and from which said belts are independently wound and unwound, means, substantially as described, for adjusting said belts to expose them to view, an independent adjustable screen, also located in rear of and adjacent to each of said transparent or semi-transparent sides, and stereopticons, whereby advertisements may be projected upon said screens when the belts are removed from view, all as and for the purpose set forth.

9. In an advertising medium and in combination, a body mounted upon wheels, a cover or casing therefor having transparent or semi-transparent sides, movable belts arranged in juxtaposition to said sides, and means, substantially as described, to operate said belts, removable advertisement-receiving sections, clamps secured to opposite ends of said sections, ears or tags secured to said clamps and provided with apertures, and buttons secured to said belts to secure said sections in position, as and for the purpose specified.

10. In an advertising medium, a body having sides provided with projecting ledges having inclined outer edges, wheels to support said body, and a cover or casing inclosing said body, in combination with transparent sides parallel with said inclined ledges, a movable advertisement-receiving screen in juxtaposition to each of said sides, rollers to move each of said screens independently of the others when desired, and means, substantially as described, to project advertisements upon said screens, as and for the purpose specified.

In testimony whereof I have signed my name to this specification in the presence of two subscribing witnesses.

JOHN F. NICHOLS.

Witnesses:
S. B. MINSHALL,
WALLACE HOOPER.